United States Patent [19]
Takahashi

[11] Patent Number: 5,100,219
[45] Date of Patent: Mar. 31, 1992

[54] OPTICAL FIBER MULTIPLEXING/DEMULTIPLEXING DEVICE FOR MULTIPLE-FIBER RIBBON OF OPTICAL FIBERS AND THEIR FABRICATION METHOD

[75] Inventor: Mitsuo Takahashi, Matsudo, Japan

[73] Assignee: Seikoh Giken Co., Ltd., Matsudo, Japan

[21] Appl. No.: 647,504

[22] Filed: Jan. 29, 1991

[30] Foreign Application Priority Data

Oct. 5, 1990 [JP] Japan .................................. 2-268164

[51] Int. Cl.⁵ .............................................. G02B 6/26
[52] U.S. Cl. ...................................................... 385/30
[58] Field of Search ............... 350/96.15, 96.20–96.21

[56] References Cited

U.S. PATENT DOCUMENTS

| | | | |
|---|---|---|---|
| 4,343,532 | 8/1982 | Palmer | 350/96.19 |
| 4,461,536 | 7/1984 | Shaw et al. | 350/96.15 |
| 4,493,528 | 1/1985 | Shaw et al. | 350/96.15 |
| 4,556,279 | 12/1985 | Shaw et al. | 350/96.15 |
| 4,737,007 | 4/1988 | Alferness et al. | 350/96.19 |
| 4,834,481 | 5/1989 | Lawson et al. | 350/96.15 |
| 4,909,584 | 3/1990 | Imoto et al. | 350/96.15 |
| 4,953,935 | 9/1990 | Suchoski, Jr. et al. | 350/96.16 |
| 4,991,922 | 2/1991 | Dahlgren | 350/96.15 |
| 5,000,530 | 3/1991 | Takahashi | 350/96.15 |
| 5,015,058 | 5/1991 | Thorncraft et al. | 350/96.15 |

OTHER PUBLICATIONS

"A Large Tolerant Single-Mode Optical Fiber Coupler with a Tapered Structure", Yamamoto et al., IEEE Proceedings, Jun. 1976, pp. 1013–1014.

"Optical Demultiplexer Using Coupling Between Nonidentical Waveguides", Kobayashi et al., Applied Optics, vol. 17, No. 20, Oct. 15, 1978.

*Primary Examiner*—Akm Ullah
*Attorney, Agent, or Firm*—Spencer & Frank

[57] ABSTRACT

An optical fiber multiplexing/demultiplexing devices for the multiple-fiber ribbon of optical fibers, and the fabrication method. It comprises a set of optical fibers arranged in the form of a multiple-fiber ribbon wherein an intermediate point on the multiple-fiber ribbon is first cut, the covers of the optical fibers in the multiple-fiber ribbon thus cut are removed on both sides of the cut edges by a certain length required to expose the optical fiber elements, and both edges of the optical fiber elements paired on both sides of the cut point are welded each other by arc discharge; a pair of substrates in each of which a plurality of V-grooves by the number of the optical fiber elements are provided in parallel each other at equal intervals to form an array on one side thereof, and the pair of substrates assembled so that the scrubbed sides of the surfaces in the pair of substrates are contacted each other so as to couple the cores of the optical fiber elements together according to the Evanescent wave coupling.

12 Claims, 4 Drawing Sheets

A — A

B-B

OPTICAL FIBER MULTIPLEXING/DEMULTIPLEXING DEVICE FOR MULTIPLE-FIBER RIBBON OF OPTICAL FIBERS AND THEIR FABRICATION METHOD

BACKGROUND OF THE INVENTION

The present invention relates to the optical fiber multiplexing/demultiplexing devices necessary for multiplexing or demultiplexing the optical fiber communication circuits, and in particular to the optical fiber multiplexing/demultiplexing devices for the multiple-fiber ribbon of optical fibers, which are made of ribbons each consisting of parallelly arranged two or more optical fibers, and their fabrication method.

FIG. 5 shows the structure of the multiple-fiber ribbon of optical fibers. In FIG. 5, 16 indicates an optical fiber element, and an optical fiber 18 consists of optical fiber element 16 and coated cover 17 made of soft plastic material surrounding optical fiber element 16. Multiple-fiber ribbon of optical fibers 19 is made of an array of 4 to 12 parallelly arranged optical fibers.

Development of optical fiber multiplexing/demultiplexing devices dedicated to multiplex optical signals from "2n" to "n" optical fibers on pair of multiple-fiber ribbons, or to demultiplex optical signals from "n" to "2n" is now in progress.

FIGS. 6(a) and 6(b) show the structure of the simplest 2 by 2 multiplexing/demultiplexing device. This type of 2×2 multiplexing/demultiplexing device utilizes the Evanescent Wave Coupling known in U.S. Pat. No. 4,556,279 and is fabricated in the manner described below.

V-grooves 24a and 24b are symmetrically provided on the closed sides of substrates 25a and 25b, respectively. Thereafter, covers 26a and 26b of the optical fibers are removed by using a sharp knife so as to expose optical fiber elements 23a and 23b, respectively. Optical fiber elements 23a and 23b are then buried into V-grooves 24a and 24b of substrates 25a and 25b, respectively, Clads 21a and 21b of optical fiber elements 23a and 23b are scrubbed off from the closed sides of substrates 25a and 25b together with substrates 25a and 25b so that cores 20a and 20b of optical fibers elements 23a and 23b are just before exposed, as indicated by the cross-section view of FIG. 6(b). The scrubbed surfaces of the respective optical fibers are attached together to assemble the device.

The aforementioned scrubbing method can apply to construct a multiplexing/demultiplexing device for the multiple-fiber ribbon of optical fibers.

In this configuration, a plurality of V-grooves running in parallel each other are to be finished with extremely high precision so that a plurality of optical fiber elements are buried in a plurality of V-grooves provided on one side of each substrate. Recent advanced high-precision work enables a plurality of V-grooves precisely running in parallel on one side of each substrate to be finished with high precision.

After a plurality of optical fibers constituting a multiple-fiber ribbon are placed into a plurality of V-grooves parallelly running on one side of each substrate, the covers of the optical fiber elements to be buried into the V-grooves are to be removed to expose the optical fiber elements.

After a plurality of optical fiber elements are manually exposed by using a sharp knife in the same manner as in the 2 by 2 multiplexing/demultiplexing device shown in FIGS. 6(a) and 6(b), a plurality of V-grooves are to be cleaned. The cleaning is to be carried out with care and skill because each optical fiber element is made of fragile quartz, and is 0.125 mm in outer diameter. If the covers of the multiple-fiber ribbon of 4 through 12 optical fibers are removed at a time in the same manner as above, part of the covers surrounded by other optical fiber elements remains uncleaned and unremoved.

The optical fiber elements of the multiple-fiber ribbon are to be separated and then the covers of the optical fiber elements are to be separately removed one after another. The V-grooves are thereafter to be cleaned with care. These processes of fabricating the multiplexing/demultiplexing device are to be improved to improve the workability in mass-production.

An objective of the present invention is to present a multiplexing/demultiplexing device for the multiple-fiber ribbon of optical fibers wherein the respective optical fiber elements can precisely be fastened on each substrate, variations in the optical power division ratios in the respective pair of optical circuits can be reduced, and defects which may occur in the optical fiber elements during the scrubbing process can be reduced.

Another objective of the present invention is to present a method of fabricating a multiplexing/demultiplexing device for the multiple-fiber ribbon of optical fibers wherein the scrubbing of the optical fiber elements on each substrate is suitable for use in mass-production of the respective devices.

SUMMARY OF THE INVENTION

The optical fiber multiplexing/demultiplexing device for the multiple-fiber ribbon of optical fibers, built in accordance with the present invention, consists of a set of optical fibers arranged in the form of multiple-fiber ribbon and a pair of substrates.

The set of optical fibers are arranged in the form of the multiple-fiber ribbon by such a process that an intermediate point on the multiple-fiber ribbon is first cut, the covers of the optical fibers in the multiple-fiber ribbon cut at the intermediate point are removed on both sides by a certain length required to expose the optical fiber elements, and both edges of the optical fiber elements paired on both sides of the cut point are connected each other by arc discharge.

Each substrate is finished by such a process that a plurality of V-grooves by the number of the optical fiber elements are provided in parallel each other at equal intervals to form an array on one side thereof, a hollow is provided at both edges of the V-grooves to mount the covers of the optical fibers in the multiple-fiber ribbon of optical fibers, and a trench is provided at the center of the V-groove array across the plurality of V-grooves at right angle.

The optical fiber multiplexing/demultiplexing device for the multiple-fiber ribbon, built in accordance with the present invention, is characterized by such an assembly that the optical fiber elements are buried together into and fastened to the V-grooves by some adhesives, the clads of the optical fiber elements are scrubbed together with the one side of the surfaces of each substrate so that the cores of the optical fiber elements are just before exposed, and the pair of substrates are assembled so that the scrubbed sides of the surfaces in the pair of substrates are contacted each other so s to contact the cores of the optical fiber elements together.

The method of fabricating the optical fiber multiplexing/demultiplexing device for the multiple-fiber ribbon of optical fibers consists of "Remove covers of optical fibers" step, "Fuse and connect" step, "Work on substrate" step, "Assemble a pair of substrates" step, and "Assemble multiplexing/demultiplexing device" step.

"Remove covers of optical fibers" step is such that an intermediate point on the multiple-fiber ribbon is first cut, and that the covers of the optical fibers in the multiple-fiber ribbon cut at the intermediate point are removed on both sides by a certain length required to expose the optical fiber elements.

"Fuse and connect" step is such that both edges of the optical fiber elements paired on both sides of the cut point are fused and connected each other by arc discharge.

"Work on substrate" step is such that a plurality of V-grooves by the number of the optical fiber elements are provided in parallel each other at equal intervals to form an array on one side of each of a pair of substrates, a hollow is provided at both edges of the V-grooves to mount the covers of the optical fibers in the multiple-fiber ribbon of optical fibers, and a trench is provided at the center of the V-groove array across the plurality of V-grooves at right angle.

"Assemble a pair of substrates" step is such that the optical fiber elements are buried together into and fastened to the V-grooves by some adhesives, and that the clads of the optical fiber elements are scrubbed together with the one side of the surfaces of each substrate so that the cores of the optical fiber elements are just before exposed.

"Assemble multiplexing/demultiplexing device" step is such that the pair of substrates are assembled so that the scrubbed sides of the surfaces in the pair of substrates are contacted each other so as to contact the cores of the optical fiber elements together.

A trench provided across a number of V-grooves on each of the pair of substrates at right angle at the center thereof avoids the fused and welded optical fiber elements against partly flowing from the substrate at their connection points even if the deformation, extension, and/or off-centering which may be caused by the discharge arc welding of the optical fiber elements has occurred in the connections of the welded optical fiber elements. Thus, the optical fiber multiplexing/demultiplexing device for the multiple-fiber ribbon of optical fibers, wherein the optical fiber elements are stably and reliably fastened to the substrate with high precision, can be actualized.

The covers of the optical fiber elements in the multiple-fiber ribbon can simply be removed without any remainders by using a cleaver known conventionally, and this improves the speed of fabricating the devices in mass-production.

BRIEF DESCRIPTION OF THE DRAWINGS

FIG. 1(a) indicates that the optical fiber elements cut into two pieces are being welded by discharge arc. FIG. 1(b) indicates that the optical fiber elements cut into two pieces have been welded.

FIGS. 2(a), 2(b) and 2(c) are top, side and end views of the substrate, respectively.

FIGS. 3(a) and 3(b) are the side and cross-sectional (cut across the line A—A) views of the substrate assembly, respectively.

FIG. 4(a) and 4(b) are a side view and a cross-sectional view (cut across the line B—B) of the device, respectively.

FIGS. 6(a) and 6(b) are a side view and a cross-sectional view (cut across the line 6(c)—6(c) of FIG. 6(a)), respectively.

PREFERRED EMBODIMENTS

Figure 1A:
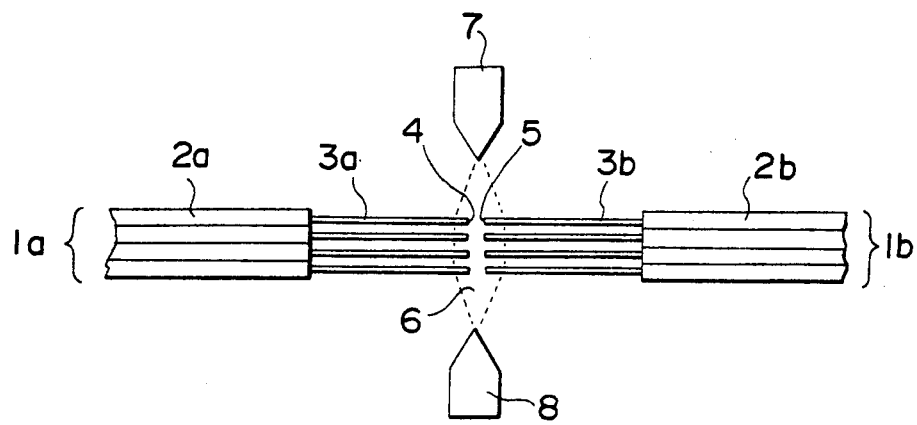
FIGS. 1(a) and 1(b) show how to fabricate the optical fiber multiplexing/demultiplexing device for the four-core ribbon of optical fibers built in accordance with the present invention.

The present invention will be described referring to the drawings.

Figure 1B:
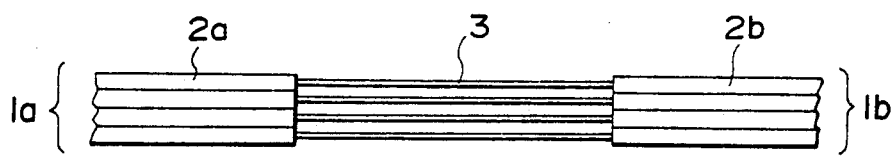

FIGS. 1(a) and 1(b) show how to fabricate the optical fiber multiplexing/demultiplexing device for the four-core ribbon of optical fibers built in accordance with the present invention.

In FIGS. 1(a) and 1(b), optical fibers of the four-core ribbon is cut into two pieces 1a and 1b, and covers 2a and 2b are removed by using cleaver by a certain length from edges 4 and 5 of the optical fiber elements, respectively.

Edges 4 and 5 of optical fiber elements 3a and 3b are welded to connect them together by discharge arc.

In FIG. 1(a), edges 4 and 5 of optical fiber elements 3a and 3b are faced each other, and they are put into a gap between discharge electrodes 7 and 8 so that the edges 4 and 5 are welded together by discharge arc 6.

In FIG. 1(b), the discharge arc welding is completed and optical fiber elements 3 have completely been connected.

Figure 2A:
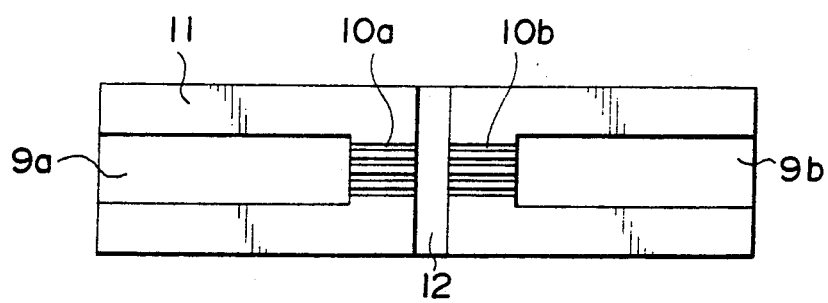
FIGS. 2(a) and 2(b) and 2(c) show an embodiment of a substrate used to construct the optical fiber multiplexing/demultiplexing device built in accordance with the present invention.
Figure 2C:
Figure 2B:
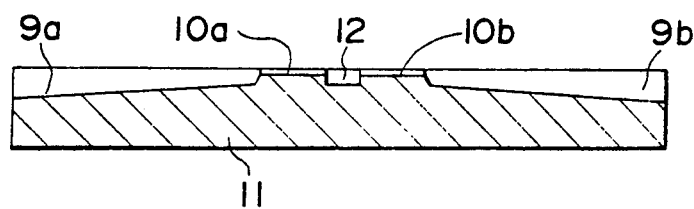

FIGS. 2(a), 2(b) and 2(c) show an embodiment of a substrate used to construct the optical fiber multiplexing/demultiplexing device built in accordance with the present invention. FIG. 2(a) is a top view of the substrate, and FIGS. 2(b) and 2(c) are side and end views thereof, respectively.

Substrate 11 provides four parallelly running V-grooves 10a and 10b in equal spans along the length thereof on the surface thereof. The number of V-grooves is the same as that (four) of optical fiber elements in 4-core ribbon. Trench 12 is provided deeper than the V-grooves across the V-grooves 10a and 10b at right angle at the center of substrate 11. Trench 12 absorbs the deformation, extension, and/or off-centering of the welded optical fiber elements at the connections. Hollows 9a and 9b are provided along the length of substrate 11 at both edges thereof so as to store the covers of the optical fiber elements in the 4-core ribbon.

Hollows 9a and 9b are such that the bottoms thereof are inclined deeply toward their edges.

Figure 3A:
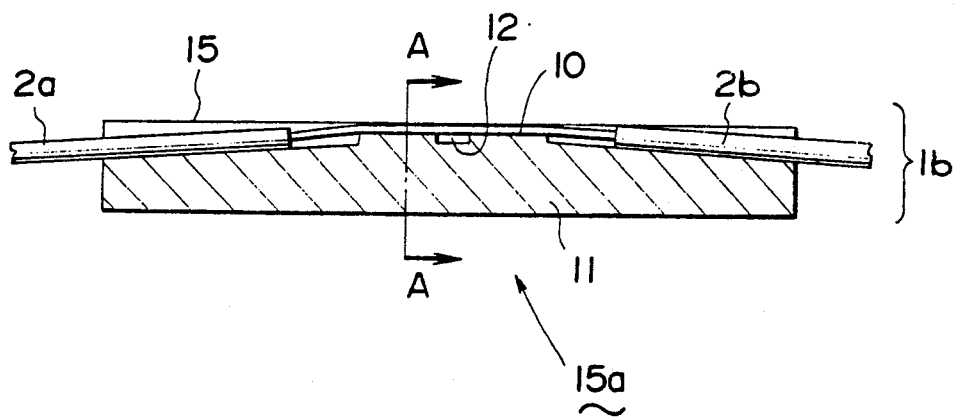
FIGS. 3(a) and 3(b) show the substrate assembly.
Figure 3B:
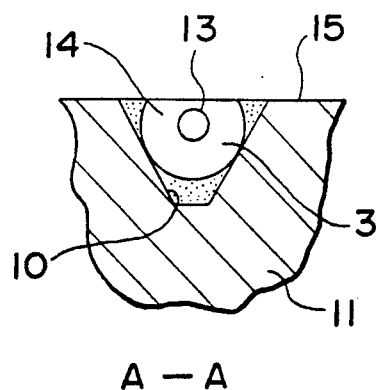

FIGS. 3(a) and 3(b) are a side view and a cross-sectional view (cut across the line A—A) of the substrate assembly wherein the optical fibers of the 4-core ribbon have been welded to, fastened to, and scrubbed together with the substrate shown in FIGS. 2(a) and 2(b).

Each optical fiber element is buried into each of four V-grooves 10 so that the welded connections of the optical fiber elements are stored in trench 12 of substrate 11. In addition, covers 2a and 2b of optical fiber elements 3 in 4-core ribbons 1a and 1b are stored in hollows 9a and 9b and fastened there. Clad 14 of optical fiber element 3 is scrubbed together with surface 15 of substrate 11. The scrubbing is carried out to such an extent that core 13 of optical fiber element 3 is just before exposed, and clad 14 is scrubbed off by a certain depth.

Figure 4A:
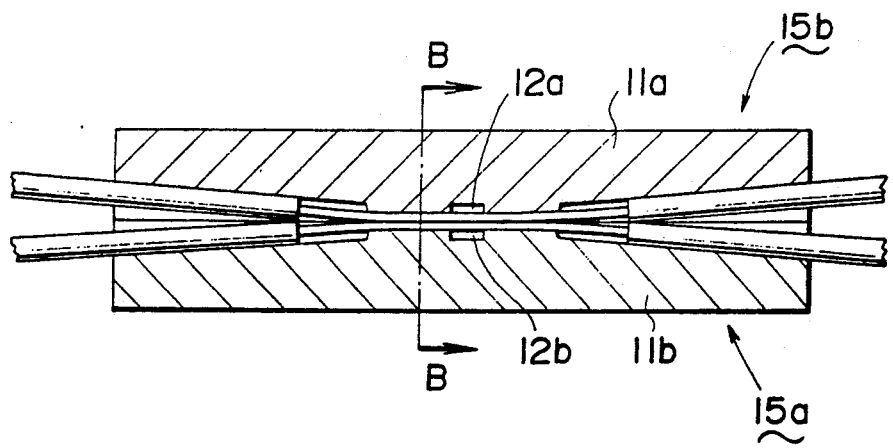
FIGS. 4(a) and 4(b) show the show the structure of the optical fiber multiplexing/demultiplexing device for the multiple-fiber ribbon of optical fibers according to the present invention.

A pair of substrate assemblies 15a and 15b (FIG. 4(a)) are provided to assemble them together.

Figure 4B:
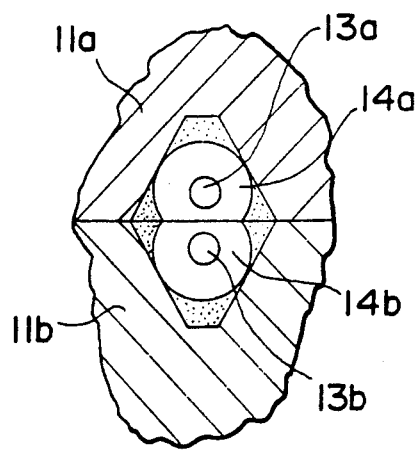
Figure 5:
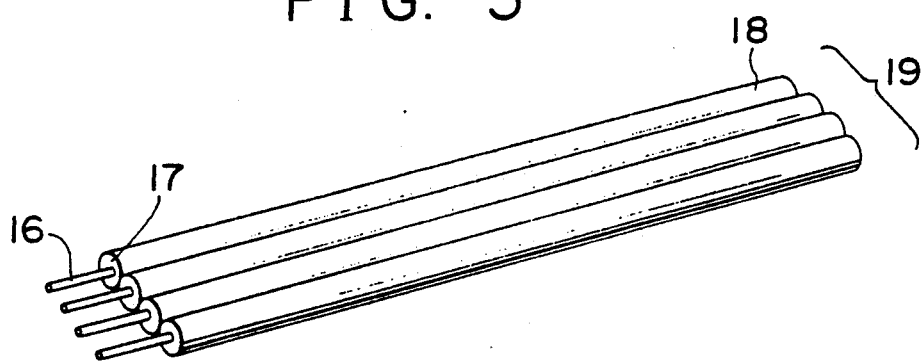
FIG. 5 shows a perspective view of the multiple-fiber ribbon of optical fibers.
Figure 6A:
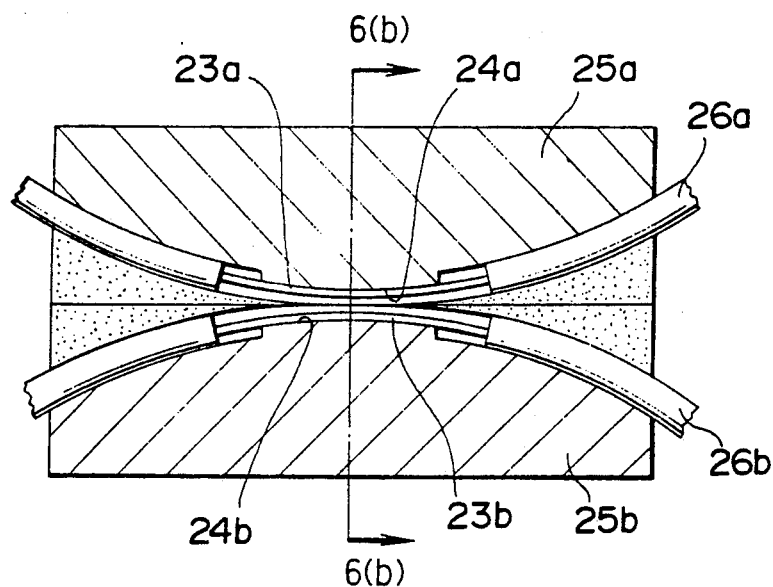
FIGS. 6(a) and 6(b) show the conventional optical fiber multiplexing/demultiplexing device.
Figure 6B:
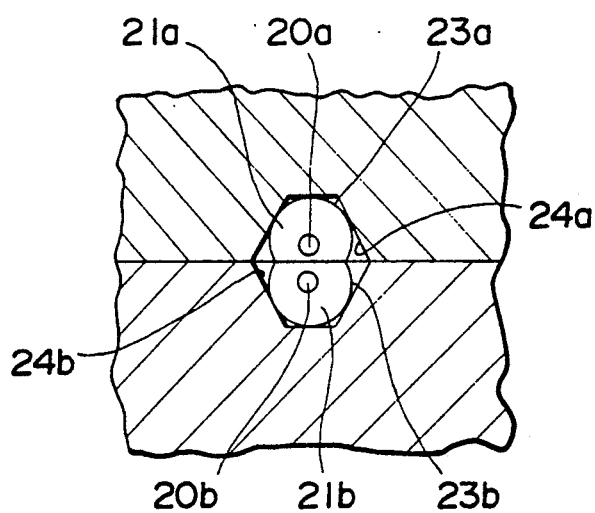

FIGS. 4(a) and 4(b) show the structure of the optical fiber multiplexing/demultiplexing device for the multiple-fiber ribbon of optical fibers, which has been built by using a pair of substrate assemblies. FIG. 4(a) is a side view of the device and FIG. 4(b) is a cross-sectional view of the device cut along the line B—B.

The scrubbed surfaces of substrate assemblies 15a and 15b are contacted each other to assemble them together.

The method of fastening the substrate assemblies and optical fiber elements is arbitrary but the fastening is to be tight.

As described heretofore, the optical fiber multiplexing/demultiplexing device for the multiple-fiber ribbon is fabricated in the manner described below.

The covers of the optical fiber elements fastened to each substrate by putting them into V-grooves of each substrate can be removed by such processes that the multiple-fiber ribbon of optical fibers is first cut, the covers of the optical fiber elements are removed by using a cleaver, conventional known, by a certain length from the cut edges, the optical fiber elements are faced at their cut edges, and then they are welded to connect together by discharge arc at a time. The operation of removing the covers of the optical fiber elements in the multiple-fiber ribbon is an easy work. Both the productivity and workability are greatly improved as compared with those in the conventional method wherein the cores of the optical fiber elements are manually separated from the multiple-fiber ribbon so as to obtain the separate optical fiber elements and then the covers of the optical fiber elements are separately removed by using a sharp knife.

A trench provided across a number of V-grooves on each of a pair of substrates at right angle at the center thereof avoids the welded optical fiber elements against partly displaced by deformation thereof from each substrate at their connection points even if the deformation, extension, and/or off-centering which may be caused by the discharge arc welding of the optical fiber elements has occurred in the connections of the welded optical fiber elements. Thus, the respective optical fiber elements can precisely be fastened on each substrate, variations in the optical power division ratios in the respective pair of optical circuits can be reduced, and defects which may occur in the optical fiber elements during the scrubbing process can be reduced.

What is claimed is:

1. An optical fiber multiplexing/demultiplexing device for the multiple-fiber ribbon of optical fibers comprising:

a set of optical fibers arranged in the form of a multiple-fiber ribbon wherein an intermediate point on the multiple-fiber ribbon is first cut, the covers of the optical fibers in the multiple-fiber ribbon cut at the intermediate point are removed on both sides of the cut edges by a certain length required to expose the optical fiber elements, and both edges of the optical fiber elements paired on both sides of the cut point are welded each other by arc discharge;

a pair of substrates in each of which a plurality of V-grooves by the number of the optical fiber elements are provided in parallel each other at equal intervals to form an array on one side thereof, a hollow is provided at both ends of the V-grooves to mount the covers of the optical fibers in the multiple-fiber ribbon of optical fibers, and a trench is provided at the center of the V-groove array across the plurality of V-grooves at right angle; and an assembly of the optical fiber elements buried together into and fastened to the V-grooves by some adhesives, the clads of the optical fiber elements scrubbed together with the one side of the surfaces of each substrate so that the cores of the optical fiber elements are just before exposed, and the pair of substrates assembled so that the scrubbed sides of the surfaces in the pair of substrates are contacted each other so as to couple the cores of the optical fiber elements together according to the Evanescent wave coupling.

2. An optical fiber multiplexing/demultiplexing device for the multiple-fiber ribbon of optical fibers, as claimed in claim 1, wherein the optical fiber elements are made of quartz and are 0.125 mm in outer diameter, and the optical fiber elements are surrounded by the covers coated by plastic material.

3. An optical fiber multiplexing/demultiplexing device for the multiple-fiber ribbon of optical fibers, as claimed in claim 1, wherein the number of V-grooves is same as that of optical fiber elements.

4. An optical fiber multiplexing/demultiplexing device for the multiple-fiber ribbon of optical fibers, as claimed in claim 3, wherein the number of V-grooves is 4 through 12.

5. An optical fiber multiplexing/demultiplexing device for the multiple-fiber ribbon of optical fibers, as claimed in claim 1, wherein the trench is deeper than the V-grooves, and the hollows are such that the bottoms thereof are inclined deeply toward their edges.

6. An optical fiber multiplexing/demultiplexing device for the multiple-fiber ribbon of optical fibers, as claimed in claim 5, wherein the trench is used to avoid the alloyed optical fiber elements against partly being displaced by deformation thereof from the substrate at their weling points even if the deformation, extension, and/or off-centering which may be caused by the discharge arc welding of the optical fiber elements has occurred in the fusion welding of the optical fiber elements.

7. A method of fabricating the optical fiber multiplexing/demultiplexing device for the multiple-fiber ribbon of optical fibers consisting of:

"Remove covers of optical fibers" step wherein an intermediate point on the multiple-fiber ribbon is first cut, and the covers of the optical fibers in the multiple-fiber ribbon cut at the intermediate point are removed on both sides by a certain length required to expose the optical fiber elements;

"Fuse and connect" step wherein both edges of the optical fiber elements paired on both sides of the cut point are welded each other by arc discharge;

"Work on substrate" step wherein a plurality of V-grooves by the number of the optical fiber elements are provided in parallel each other at equal intervals to form an array on one side of each of a pair of substrates, a hollow is provided at both edges of the V-grooves to mount the covers of the optical fibers in the multiple-fiber ribbon of optical fibers, and a trench is provided at the center of the V-groove array across the plurality of V-grooves at right angle;

"Assemble a pair of substrates" step wherein the optical fiber elements are buried together into and fastened to the V-grooves by some adhesives, and the clads of the optical fiber elements are scrubbed together with the one side of the surfaces of each substrate so that the cores of the optical fiber elements are just before exposed; and "Assemble multiplexing/demultiplexing device" wherein the pair of substrates are assembled so that the scrubbed sides of the surfaces in the pair of substrates are contacted each other so as to couple the cores of the optical fiber elements together according to the Evanescent wave coupling.

8. A method of fabricating the optical fiber multiplexing/demultiplexing device for the multiple-fiber ribbon of optical fibers, as claimed in claim 7, wherein the optical fiber elements are made of quartz and are 0.125 mm in outer diameter, and the optical fiber elements are surrounded by the covers made of plastic material.

9. A method of fabricating the optical fiber multiplexing/demultiplexing device for the multiple-fiber ribbon of optical fibers, as claimed in claim 7, wherein the number of V-grooves is the same as that of optical fiber elements.

10. A method of fabricating the optical fiber multiplexing/demultiplexing device for the multiple-fiber ribbon of optical fibers, as claimed in claim 9, wherein the number of V-grooves is 4 through 12.

11. A method of fabricating the optical fiber multiplexing/demultiplexing device for the multiple-fiber ribbon of optical fibers, as claimed in claim 7, wherein the trench is deeper than the V-grooves, and the hollows are such that the bottoms thereof are inclined deeply toward their edges.

12. A method of fabricating the optical fiber multiplexing/demultiplexing device for the multiple-fiber ribbon of optical fibers, as claimed in claim 7, wherein the trench is used to avoid the welded optical fiber elements against partly displaced by deformation thereof from the substrate at their connection points even if the deformation, extension, and/or off-centering which may be caused by the discharge arc welding of the optical fiber elements has occurred in the connections of the welded optical fiber elements.

* * * * *